US012786796B2

(12) United States Patent
Sakaue

(10) Patent No.: US 12,786,796 B2
(45) Date of Patent: Nov. 3, 2026

(54) CONTROL SYSTEMS, CONTROL METHODS, CONTROLLERS, AND PROGRAMS

(71) Applicant: NTT, Inc., Tokyo (JP)

(72) Inventor: Yuki Sakaue, Musashino (JP)

(73) Assignee: NTT, Inc., Tokyo (JP)

( * ) Notice: Subject to any disclaimer, the term of this patent is extended or adjusted under 35 U.S.C. 154(b) by 50 days.

(21) Appl. No.: 18/851,775

(22) PCT Filed: Mar. 30, 2022

(86) PCT No.: PCT/JP2022/015915
§ 371 (c)(1),
(2) Date: Sep. 27, 2024

(87) PCT Pub. No.: WO2023/188089
PCT Pub. Date: Oct. 5, 2023

(65) Prior Publication Data

US 2025/0220510 A1 Jul. 3, 2025

(51) Int. Cl.
*H04W 28/08* (2023.01)
*H04L 47/10* (2022.01)
(Continued)

(52) U.S. Cl.
CPC ......... *H04W 28/0983* (2020.05); *H04L 47/10* (2013.01); *H04L 47/626* (2013.01); *H04W 28/14* (2013.01)

(58) Field of Classification Search
CPC .. H04W 28/0983; H04W 28/14; H04L 47/10; H04L 47/626
See application file for complete search history.

(56) References Cited

U.S. PATENT DOCUMENTS 9,641,452 B2 * 5/2017 Lu .......................... H04L 47/788
2018/0131456 A1 * 5/2018 Kits van Heyningen ................... H04H 20/42
(Continued)

FOREIGN PATENT DOCUMENTS

KR 20170069759 A * 6/2017 ............ H04W 80/10
WO WO 2021176670 9/2021
WO WO 2021192323 9/2021

OTHER PUBLICATIONS

[No Author Listed], "Part 11: Wireless LAN Medium Access Control (MAC) and Physical Layer (PHY) Specifications—Amendment 8: Medium Access Control (MAC)Quality of Service Enhancements," IEEE 802.11e-2005—IEEE Standard for Information technology—Telecommunications and information exchange between systems—Local and metropolitan area networks—Specific requirements, Nov. 2005, 211 pages.
(Continued)

*Primary Examiner* — Schquita D Goodwin
*Assistant Examiner* — Joseph M Cousins
(74) *Attorney, Agent, or Firm* — Fish & Richardson P.C.

(57) ABSTRACT

An object of the present invention is to provide a control system, a control method, a controller, and a program capable of guaranteeing a band allocated to each traffic flow while following a maximum throughput of a wireless network which changes from moment to moment. The control system according to the present invention includes a terminal and an access point that transmit packets to each other via the wireless network, a telemetry apparatus that ascertains a maximum throughput of the wireless network, and a controller that performs transmission control on the terminal and the access point, and the controller determines the band control value for each traffic flow on the basis of the maximum throughput notified of by the telemetry apparatus and the required band for each traffic flow notified of by at
(Continued)

least the terminal, and notifies the terminal and the access point of the band control value.

4 Claims, 10 Drawing Sheets

(51) Int. Cl.
*H04L 47/625* (2022.01)
*H04W 28/14* (2009.01)

(56) References Cited

U.S. PATENT DOCUMENTS

| | | | |
|---|---|---|---|
| 2023/0120869 | A1 | 4/2023 | Fukui et al. |
| 2023/0199747 | A1 | 6/2023 | Sakaue et al. |

OTHER PUBLICATIONS

Ohtani et al., "IEEE802.11e—QoS Enhanced Wireless LAN standard," Journal of the Institute of Image Information and Television Engineers, 2003, 57(11):1459-1464.
Sakaue et al., "Proposal of centralized quality control independent of wireless network," IEICE General Conference, online, Mar. 9-12, 2021, 3 pages (with machine translation).

* cited by examiner

| ITEM NUMBER | NODE NUMBER | BUFFER NUMBER | PACKET AMOUNT |
|---|---|---|---|
| 1 | ACCESS POINT | 1 | $B_{01}$ |
| 2 | ACCESS POINT | 2 | $B_{02}$ |
| ··· | ··· | ··· | ··· |
| K | ACCESS POINT | K | $B_{0K}$ |
| K+1 | TERMINAL #1 | 1 | $B_{11}$ |
| K+2 | TERMINAL #1 | 2 | $B_{12}$ |
| ··· | ··· | ··· | ··· |
| K+L | TERMINAL #1 | L | $B_{1L}$ |
| ··· | ··· | ··· | ··· |
| K+L+···+1 | TERMINAL #N | 1 | $B_{N1}$ |
| K+L+···+2 | TERMINAL #N | 2 | $B_{N2}$ |
| ··· | ··· | ··· | ··· |
| K+L+···+M | TERMINAL #N | M | $B_{NM}$ |

| MAXIMUM THROUGHPUT OF MAIN SIGNAL WIRELESS NETWORK |
|---|
| $B_{MAX}$ |

FIG. 3

CONTROL SYSTEMS, CONTROL METHODS, CONTROLLERS, AND PROGRAMS

CROSS-REFERENCE TO RELATED APPLICATION

This application is a National Stage application under 35 U.S.C. § 371 of International Application No. PCT/JP2022/015915, having an International Filing Date of Mar. 30, 2022. The disclosure of the prior application is considered part of the disclosure of this application, and is incorporated by reference in its entirety into this application.

TECHNICAL FIELD

The present disclosure relates to a control system, control method, controller, and program for allocating communication bands within an access network.

BACKGROUND ART

In recent years, studies have been underway to accommodate a plurality of services or applications with various network requirements on the same network infrastructure. To this end, it is necessary to guarantee the quality required by each service or application accommodated in the same NW in an end-to-end section "from a terminal to a terminal" or "from a terminal to an application server."

The end-to-end of the network can be divided into wireless and wired sections. Among these, in the wireless section, there is a priority control function called Enhanced Distributed Channel Access (EDCA) of IEEE802.11 as an existing technology (NPL 1 and NPL 2).

CITATION LIST

Non Patent Literature

[NPL 1] IEEE 802.11e-2005-IEEE Standard for Information technology—Local and metropolitan area networks—Specific requirements—Part 11: Wireless LAN Medium Access Control (MAC) and Physical Layer (PHY) Specifications—Amendment 8: Medium Access Control (MAC) Quality of Service Enhancements

[NPL 2] "Wireless LAN standard IEEE802.11e that realizes Qos," Journal of the Institute of Image Information and Media Engineers, Vol. 57, No. 11 (2003)

[NPL 3] "Proposal of quality control technology using centralized control that does not depend on wireless network," Yuki Sakagami, Kazuki Aiura, Tatsuya Fukui, Ryohei Tsugami, Tomohiro Taniguchi, and Katsuya Minami, The Institute of Electronics, Information and Communication Engineers General Conference, B-6-5 (2021)

SUMMARY OF INVENTION

Technical Problem

However, the EDCA has a problem in that control on a terminal (destination) basis, which is control on a traffic flow basis which enables quality control on a service or application basis, is difficult. In response to this problem, NPL 3 discloses a control system that can realize quality control in a service and application unit.

However, an actual maximum throughput of a wireless network used for main signal communication fluctuates from moment to moment due to various factors such as a distance between an access point and a terminal, an obstacle, the number of terminals connected to the access point, and radio wave interference. In the control system disclosed in NPL 3, since there is no function of following the variation, there is a likelihood of scheduling that is not in accordance with an actual situation being performed.

For example, in the control system disclosed in NPL 3, when a set maximum throughput is larger than an actual throughput, a band necessary for communication allocated according to scheduling is insufficient, which causes increases in packet loss, delay, and jitter. On the other hand, in the control system disclosed in NPL 3, when the set maximum throughput is smaller than the actual throughput, packet loss, delay, and jitter do not increase, but communication usage efficiency of the wireless network decreases.

That is, the control system disclosed in NPL 3 has a problem in that it is difficult to allocate a band according to the maximum throughput of the wireless network which fluctuates from moment to moment In order to solve the above problem, an object of the present invention is to provide a control system, a control method, a controller, and a program capable of guaranteeing a band allocated to each traffic flow while following a maximum throughput of a wireless network which changes from moment to moment.

Solution to Problem

In order to achieve the above object, the control system according to the present invention includes a controller that allocates a transmission band to each traffic flow on the basis of the maximum throughput of the wireless network associated with an ascertained time change, and a notification from the terminal.

Specifically, a control system according to the present invention is a control system for controlling traffic in a wireless network, the control system including:

- a terminal and an access point configured to transmit packets to each other via the wireless network;
- a telemetry apparatus configured to ascertain a maximum throughput of the wireless network; and
- a controller configured to perform transmission control on the terminal and the access point,
- wherein the controller determines a band control value for each traffic flow on the basis of the maximum throughput notified of by the telemetry apparatus and at least a required band for each traffic flow notified of by the terminal, and notifies the terminal and the access point of the band control value.

Further, a control method according to the present invention is a control method for controlling traffic of a wireless network, the control method being

- transmission control performed on a terminal and an access point transmitting packets to each other via the wireless network by a controller, and including:
- determining a band control value for each traffic flow on the basis of the maximum throughput of the wireless network and at least the required band for each traffic flow notified of by the terminal, and notifying the terminal and the access point of the band control value.

Further, a controller according to the present invention is a controller for controlling traffic of a wireless network, wherein

- the controller is an apparatus configured to perform transmission control on a terminal and an access point that transmit packets to each other via the wireless network, and the controller includes a function of determining a band control value for each traffic flow on the basis of the maximum throughput of the wireless network and at least the required band for each traffic flow notified of by the terminal, and notifying the terminal and the access point of the band control value.

The control system or the like according to the present invention allocates a transmission band for each traffic flow according to the maximum throughput of the wireless network at a current time, on the basis of the maximum throughput of the wireless network of which the controller is notified and a required band for each traffic flow. Therefore, the present control system or the like can guarantee a band for each traffic flow according to an actual maximum throughput of the wireless network which fluctuates from moment to moment. Therefore, the present invention can provide a control system, a control method, a controller, and a program capable of guaranteeing a band allocated to each traffic flow while following a maximum throughput of a wireless network which changes from moment to moment.

Each of the terminal and the access point includes a buffer configured to accumulate transmission packets for each traffic flow;

an apparatus-side transmission and reception unit configured to transmit an accumulated amount of transmission packets for each traffic flow accumulated in the buffer to the controller as the required band, and receive a transmission time and a transmission amount of the transmission packets for each traffic flow from the controller as the band control value; and a main signal transmission unit configured to transmit the transmission packet for each traffic flow in the buffer to the wireless network according to the transmission time and the transmission amount, and the controller includes a control-side transmission and reception unit configured to receive the maximum throughput from the telemetry apparatus, receive the accumulated amount as the required band from each of the terminal and the access point, and transmit the transmission time and the transmission amount to each of the terminal and the access point as the band control value; and a scheduling unit configured to determine the transmission time and the transmission amount of the transmission packet for each traffic flow on the basis of the maximum throughput and the accumulated amount.

With this scheme, it is possible to allocate a transmission band to each traffic flow and guarantee the band for each traffic flow by controlling the transmission time and the transmission amount of packets for each traffic flow.

The present invention is a program for causing a computer to function as the controller. The controller can also be realized by a computer and a program, and the program can be recorded on a recording medium or provided through a network.

The inventions can be combined where possible.

Advantageous Effects of Invention

The present invention can provide a control system, a control method, a controller, and a program capable of guaranteeing a band allocated to each traffic flow while following a maximum throughput of a wireless network which changes from moment to moment.

BRIEF DESCRIPTION OF DRAWINGS

FIG. 3 is a diagram illustrating a database included in a controller according to the present invention.

DESCRIPTION OF EMBODIMENTS

Embodiments of the present invention will be described with reference to the accompanying drawings. The embodiments to be described hereinafter are examples of the present invention, and the present invention is not limited to the following embodiments. It is assumed that components with the same reference signs in the present specification and the drawings are the same components.

(Basic Configuration)

Figure 1:
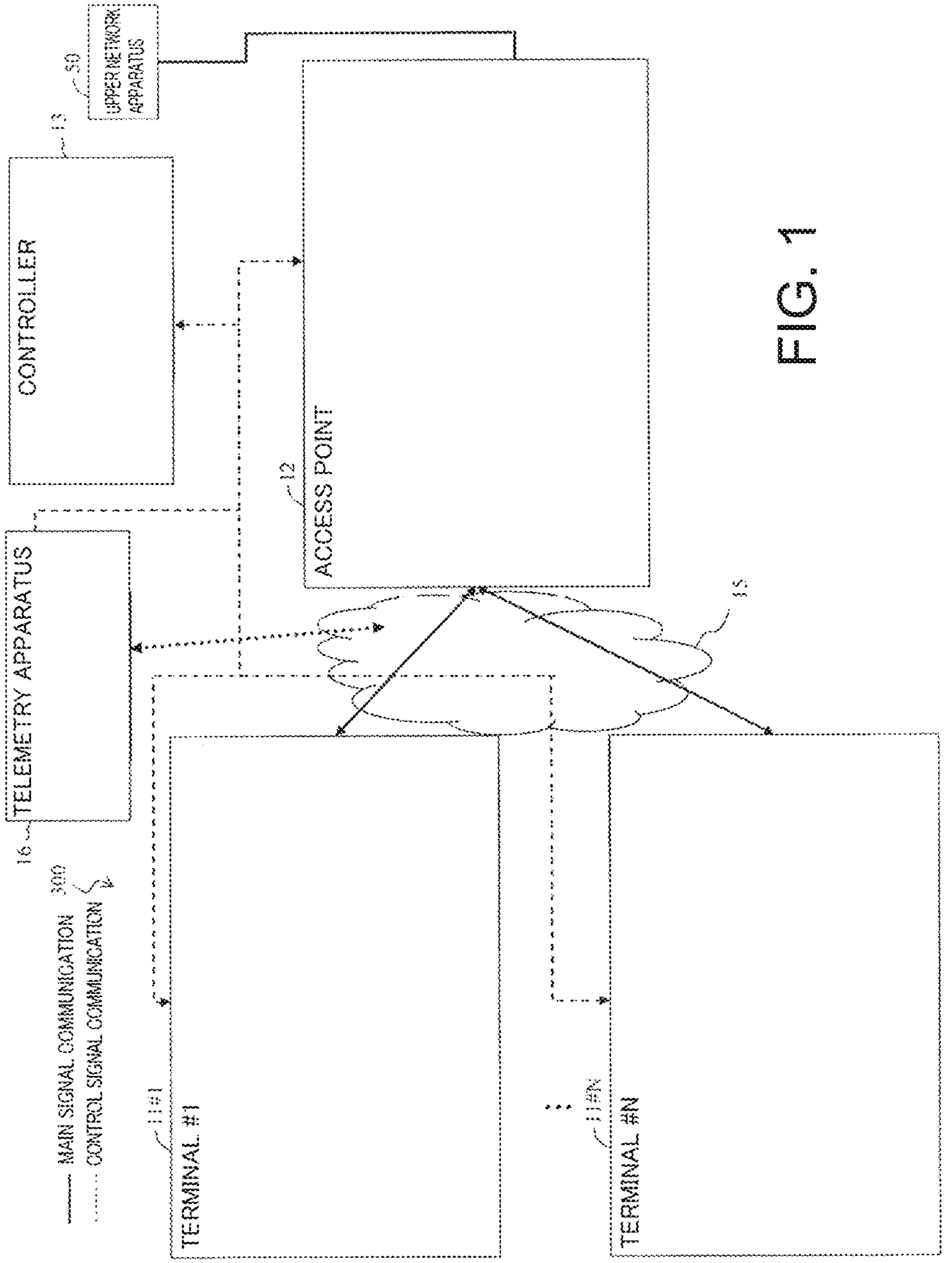
FIG. 1 is a diagram illustrating a control system according to the present invention.

First, a basic configuration of a control system of the present embodiment will be described. FIG. 1 is a diagram illustrating a control system 300 of the present embodiment. The control system 300 is a control system that controls traffic of a wireless network 15 and includes a terminal 11 and an access point 12 that transmit packets to each other via the wireless network 15;

a telemetry apparatus 16 that ascertains a maximum throughput of the wireless network 15, and a controller 13 that performs transmission control on the terminal 11 and the access point 12, and the controller 13 determines the band control value for each traffic flow on the basis of the maximum throughput notified of by the telemetry apparatus 16 and the required band for each traffic flow notified of by at least the terminal 11, and notifies the terminal 11 and the access point 12 of the band control value.

The control system 300 calculates a transmission band for each traffic flow using a required band for each traffic flow of which the terminal 11 notifies the controller 13. In this case, the controller 13 calculates the transmission band in consideration of the maximum throughput of the wireless network 15 notified of by the telemetry apparatus 16 at that time. Therefore, the control system 300 can guarantee the band allocated to each traffic flow while following the maximum throughput of the wireless network which changes from moment to moment.

There are the following schemes for band control for each traffic flow.

Embodiment 1

Figure 2A:
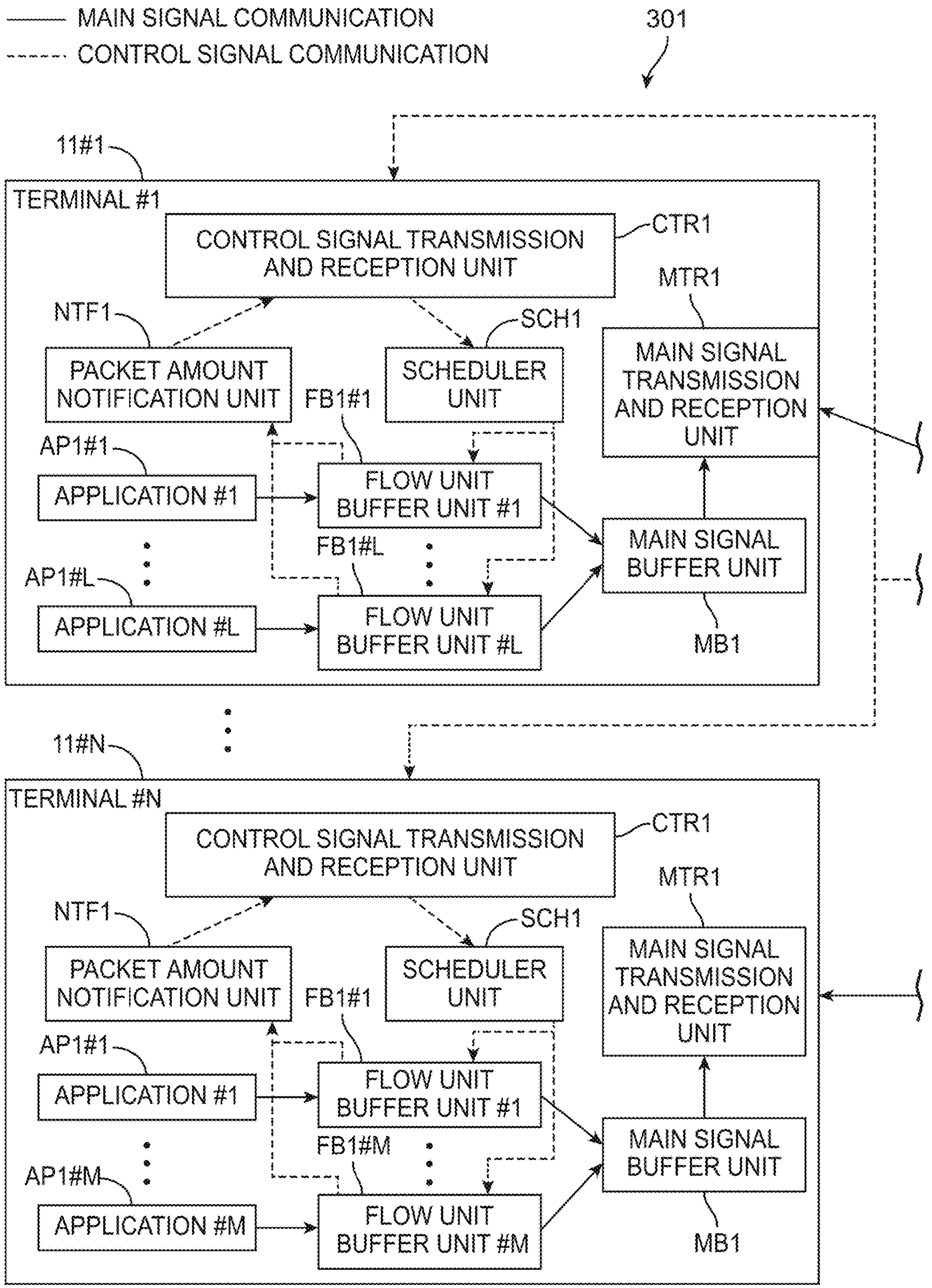
FIGS. 2A and 2B are diagrams illustrating the control system according to the present invention.
Figure 2B:
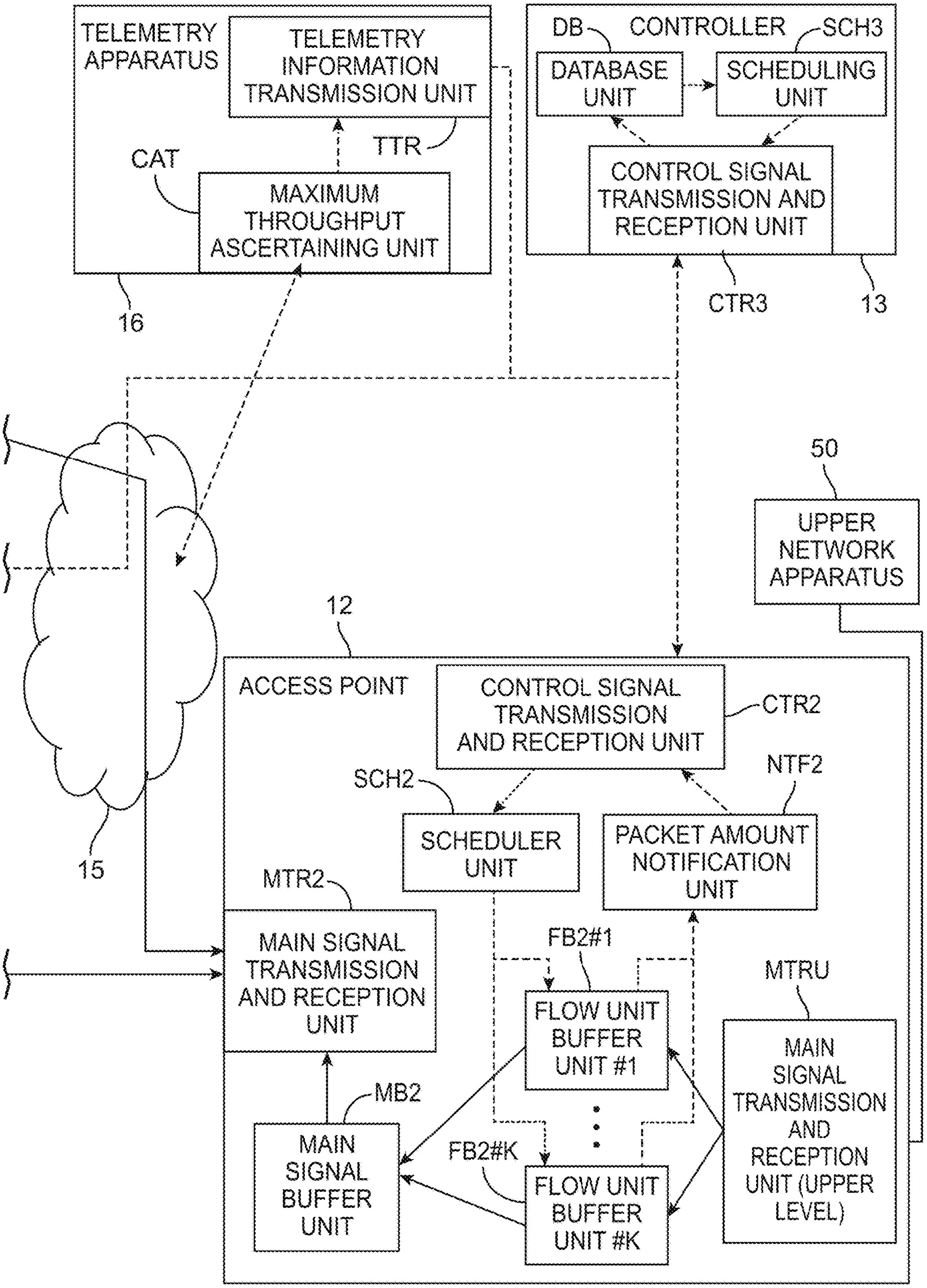

FIG. 2 is a diagram illustrating a control system 301 of the present embodiment. The control system 301 connects each terminal 11, the access point 12, the telemetry apparatus 16, and the controller 13, and performs accumulating packets in buffers (FB1 and FB2) for each traffic flow in each terminal 11 and the access point 12, or in a buffer within an application;

notifying the controller 13 of an amount of accumulated packet in advance;

determining a transmission time and a transmission amount for each traffic in the scheduling unit SCH3 of the controller 13; the controller 13 notifying each terminal 11 and the access point 12 of the transmission time and the transmission amount, and each terminal 11 and the access point 12 transmitting packets according to the notified transmission time and transmission amount.

It is assumed that times of each terminal 11, the access point 12, and the controller 13 are synchronized using NTP, PTP, or the like.

Further, the telemetry apparatus 16 includes a maximum throughput ascertaining unit CAT that ascertains the maximum throughput $B_{MAX}$ of the wireless network communicated by a main signal. A scheme by which the maximum throughput ascertaining unit CAT ascertains the maximum throughput $B_{MAX}$ will be described in an appendix to be described below. The telemetry apparatus 16 may be included in the terminal 11 or the access point 12.

Specifically, the control system 301 is a control system that controls traffic of the wireless network 15, and includes a terminal 11 and an access point 12 that transmit packets to each other via the wireless network 15; and a controller 13 that performs transmission control on the terminal 11 and the access point 12, and each of the terminal 11 and the access point 12 includes the buffers (FB1 and FB2) that accumulate transmission packets for each traffic flow, an apparatus-side transmission and reception unit (CTR1 and CTR2) that transmits the accumulated amount of the transmission packets for each traffic flow accumulated in the buffers (FB1 and FB2) to the controller 13, and receives the transmission time and the transmission amount of transmission packets for each traffic flow from the controller 13, and a main signal transmission unit (MTR1 and MTR2) that transmits the transmission packet for each traffic flow in the buffer (FB1 and FB2) to the wireless network 15 according to the transmission time and the transmission amount, and the controller 13 includes a control side transmission and reception unit CTR3 that receives the maximum throughput from the telemetry apparatus 16, receives the accumulated amount from each of the terminal 11 and the access point 12, and transmits the transmission time and the transmission amount to each of the terminal 11 and the access point 12, and a scheduling unit SCH3 that determines the transmission time and the transmission amount of the transmission packet for each traffic flow on the basis of the maximum throughput and the accumulated amount.

The control system 301 communicates control signals between the controller 13 and the access point 12/terminal 11 using a communication means different from a communication means for a main signal (traffic packet). Specifically, the control signal is transmitted or received between a control signal transmission and reception unit CTR1 of the terminal 11 and a control signal transmission and reception unit CTR3 of the controller 13, and between a control signal transmission and reception unit CTR2 of the access point 12 and the control signal transmission and reception unit CTR3 of the controller 13.

Each terminal 11 and the access point 12 periodically notify the controller 13 of the amount of packets accumulated in the flow unit buffer units (FB1 and FB2) as a control signal. The terminal 11 accumulates packets from each application AP1 in the buffer FB1 for each application (each flow). A packet amount notification unit NTF1 periodically confirms the accumulated amount of packets in each buffer FB1, and notifies the controller 13 of the accumulated amount as a control signal via the control signal transmission and reception unit CTR1.

Further, the access point 12 accumulates packets from an upper network apparatus 50 in the buffer FB2 for each application (for each flow). A packet amount notification unit NTF2 periodically confirms the accumulated amount of packets in each buffer FB2, and notifies the controller 13 of the packet amount and a buffer number as a control signal via the control signal transmission and reception unit CTR2.

The application AP1 may include the flow unit buffer unit FB1. A transmission unit TTR of the telemetry apparatus 16 transmits information (telemetry information) on the maximum throughput $B_{MAX}$ of the wireless network 15 to the controller 13 every certain period Tget.

The control signal transmission and reception unit CTR3 of the controller 13 receives the telemetry information from the telemetry apparatus 16, and receives the control signals from each terminal 11 and the access point 12. The control signal transmission and reception unit CTR3 organizes, in a database DB, the accumulated amount of packets, and information on the terminal 11, the access point 12, and the flow unit buffers (FB1 and FB2) included in the control signal. Further, the control signal transmission and reception unit CTR3 organizes, in the database DB, information on the maximum throughput $B_{MAX}$ included in the telemetry information.

FIG. 3 is a diagram illustrating an example of the information organized in the database DB. This database DB organizes the following four types of information.

An item number is a serial number for all the buffers (FB1 and FB2) of the terminal 11 and the access point 12.

A node number is a number of the access point 12 or the terminal 11.

The buffer number is a number of the buffer FB1 held in each terminal 11 or a number of the buffer FB2 held in the access point 12.

The amount of packets is the accumulated amount of packets held in the buffer with each buffer number.

For example, an item number K+2 is the accumulated amount of packets in a flow unit buffer unit FB1 #2 included in a terminal 11 #1, and indicates that the amount is "B12".

A maximum throughput of the main signal wireless network is the maximum throughput $B_{MAX}$ of the wireless network 15 acquired at a certain time.

The controller 13 performs scheduling periodically (period Tt) on the basis of the maximum throughput, accumulated amount of packets, and the information on the terminal 11, the access point 12, and the flow unit buffers (FB1 and FB2) recorded in a database unit DB, determines the latest transmission time and transmission amount for each buffer, and notifies each terminal 11 and the access point 12 of the transmission time and the transmission amount as a control signal.

The scheduling unit SCH3 of the controller 13 determines the transmission time and the transmission amount for each buffer in a current situation of the wireless network 15 from the content of the database unit DB, using a scheduling scheme to be described below. The scheduling unit SCH3 uses the determined transmission time and transmission amount as a control signal, and transmits the control signal from the control signal transmission and reception unit CTR3 to the terminal 11 or the access point 12 periodically (period Tt).

Each terminal 11 and the access point 12 extract packets accumulated in the flow unit buffer units (FB1 and FB2) at the notified transmission time and transmission amount, and input the packets to main signal buffer units (MB1 and MB2). The main signal transmission and reception units (MTR1 and MTR2) transmit packets of the main signal buffer units (MB1 and MB2) to the wireless network 15.

Figure 4A:
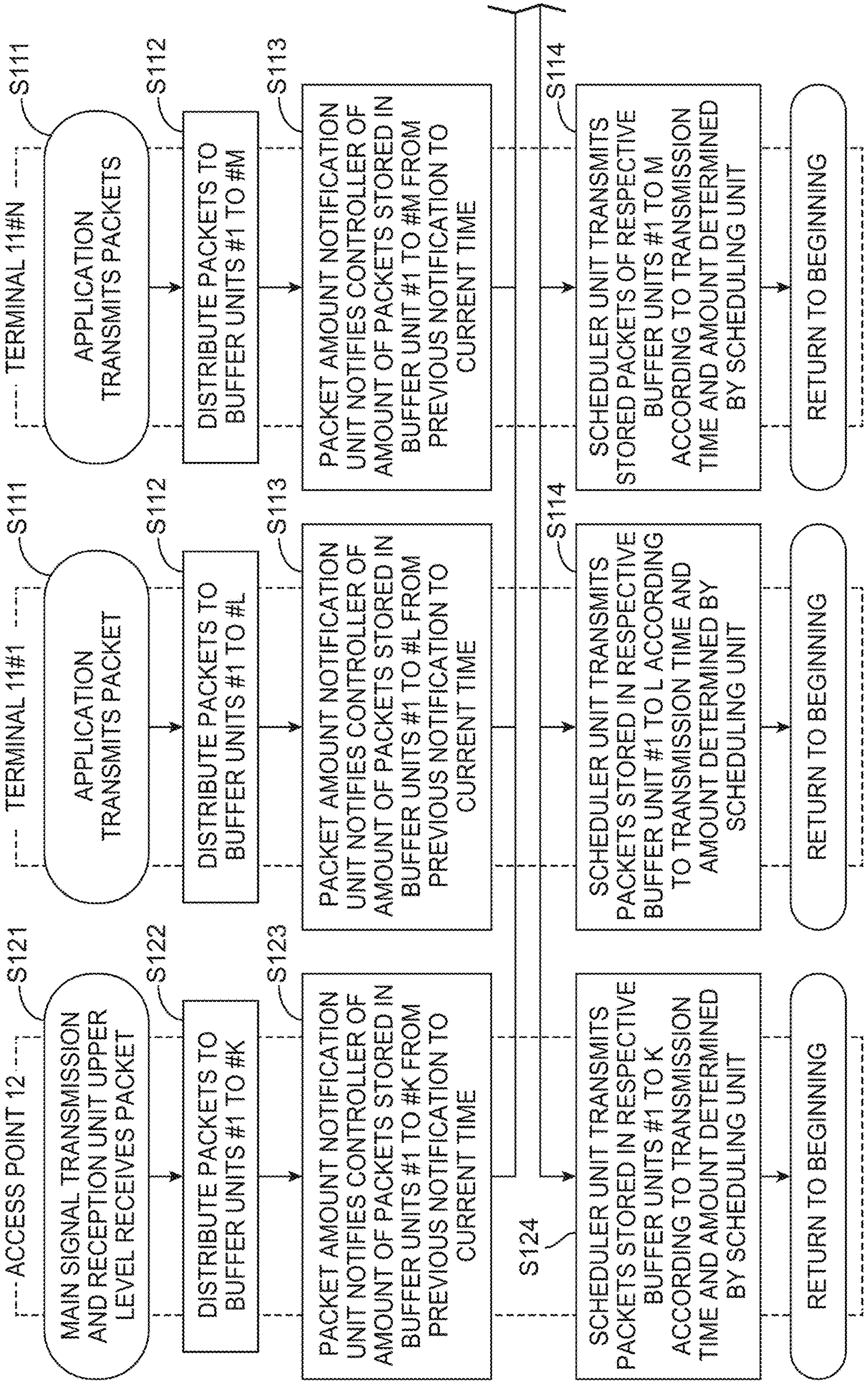
FIGS. 4A and 4B are diagrams illustrating a control method according to the present invention.
Figure 4B:
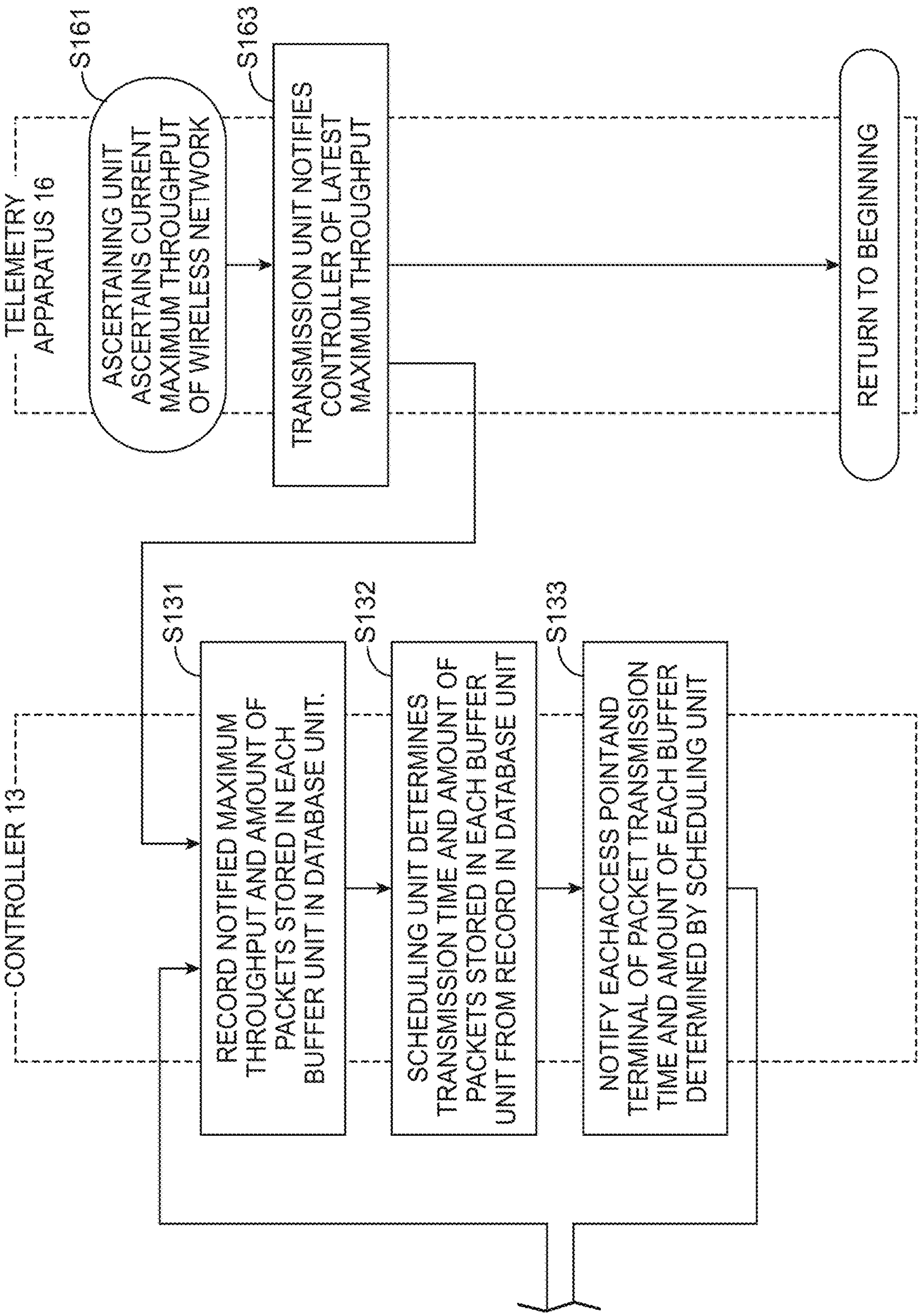

FIG. 4 is a diagram of a flowchart illustrating the operation described above. The control method of the present embodiment is a control method for controlling traffic of the wireless network 15, and The control method is transmission control that the controller 13 performs on the terminal 11 and the access point 12 that transmit packets to each other via the wireless network 15, and includes

- accumulating transmission packets for each traffic flow in the respective buffers (FB1 and FB2) of the terminal 11 and the access point 12 (steps S111, S112, S121, and S122),
- transmitting an accumulated amount of transmission packets for each traffic flow accumulated in each of the buffers to the controller 13 (steps S113 and S123);
- the telemetry apparatus 16 periodically (period Tget) detecting the maximum throughput $B_{MAX}$ of the wireless network 15 (step S161),
- transmitting the latest maximum throughput $B_{MAX}$ from the telemetry apparatus 16 to the controller 13 (step S163),
- the controller 13 determining the transmission time and the transmission amount of the transmission packets for each traffic flow in a current situation of the wireless network 15 on the basis of the latest maximum throughput $B_{MAX}$ received from the telemetry apparatus 16 and the accumulated amount received from each of the terminal 11 and the access point 12 (steps S131 and S132),
- transmitting the transmission time and the transmission amount from the controller 13 to each of the terminal 11 and the access point 12 (step S133), and
- transmitting the transmission packets for each traffic flow from the respective buffers of the terminal 11 and the access point 12 to the wireless network 15 according to the transmission time and the transmission amount (steps S114 and S124).

Effects

Figure 5A:
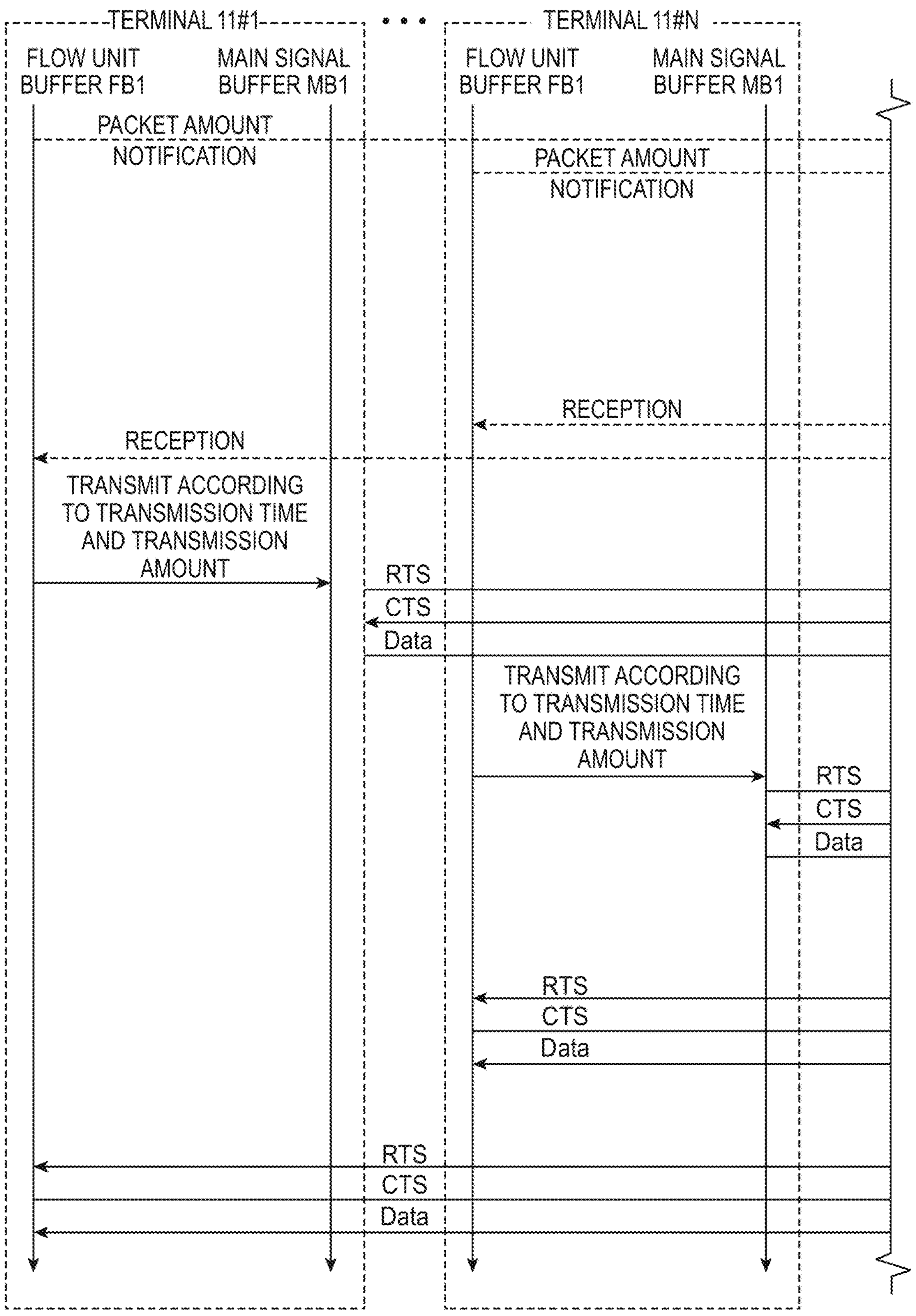
FIGS. 5A and 5B are diagrams illustrating effects of the control system concerning the present invention.
Figure 5B:
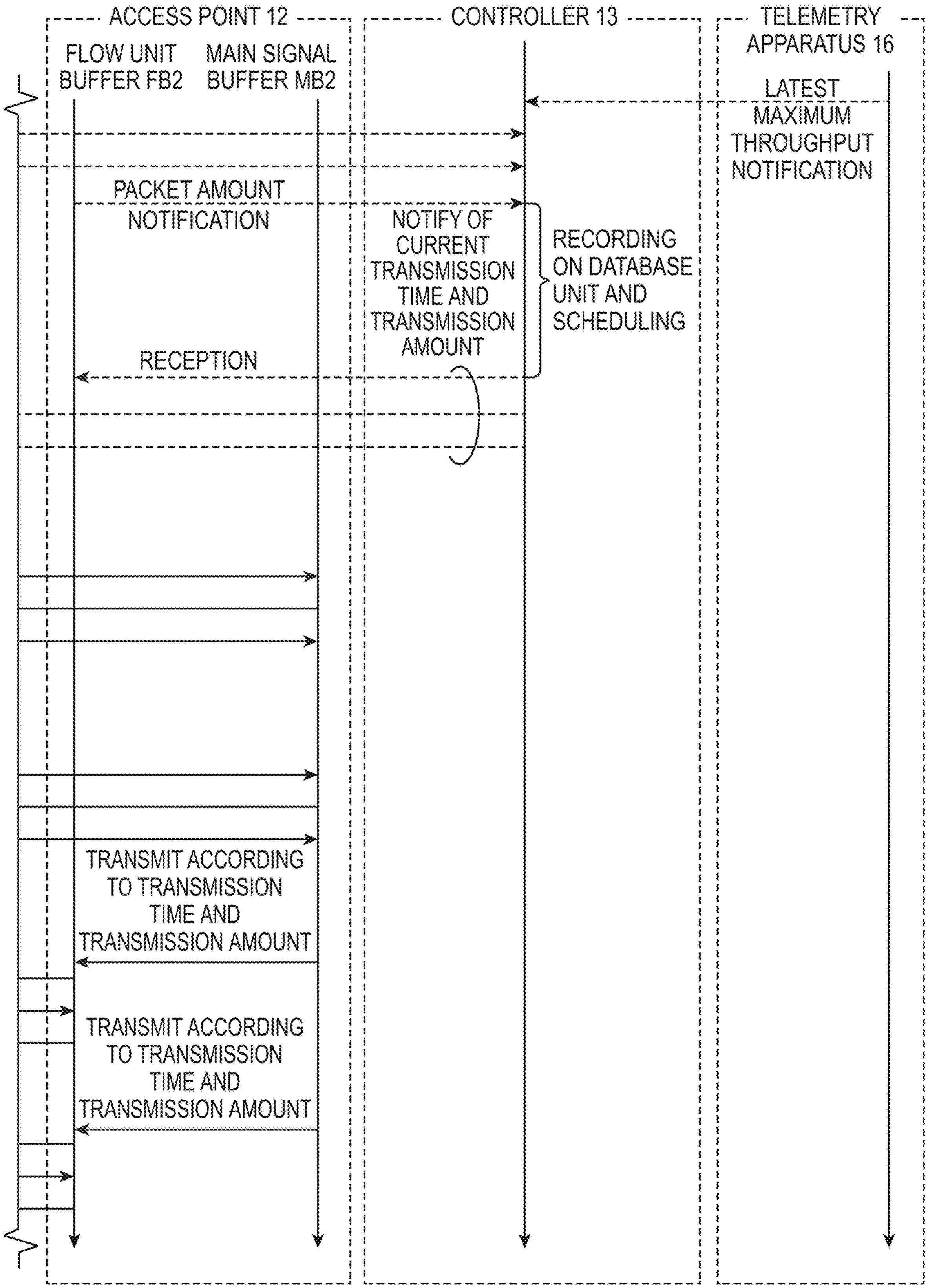
Figure 6:
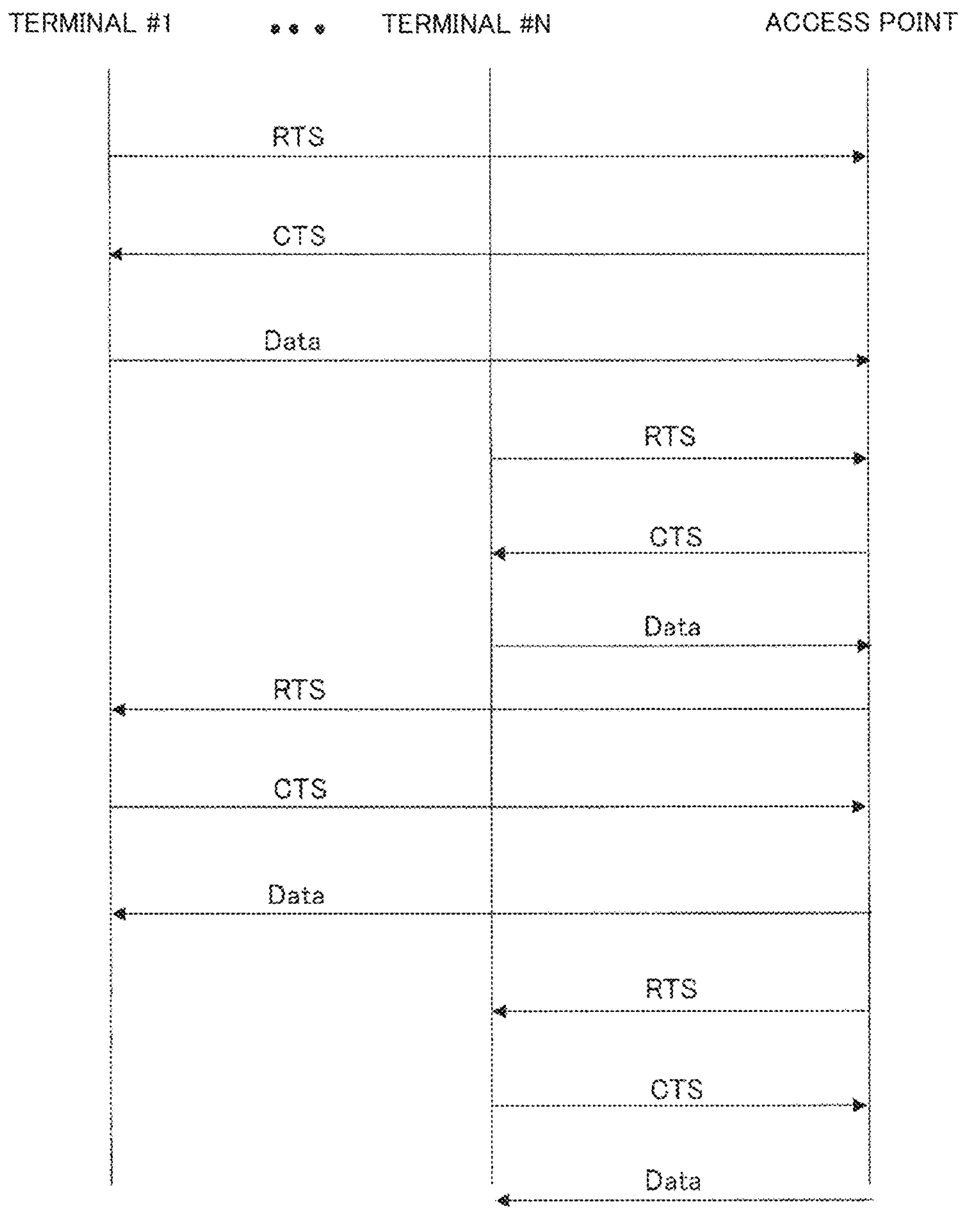
FIG. 6 is a diagram illustrating an operation of a communication system related to the present invention.

FIGS. 5 and 6 are diagrams illustrating effects of the control system 301. FIG. 5 is a sequence diagram of the control system 301, and FIG. 6 is a sequence diagram of a communication system of the related art in which there is no controller 13. In the figure, "RTS" means request to send, and "CTS" means clear to send. Further, a solid line indicates main signal communication, and a broken line indicates control signal communication.

As can be seen from a comparison between FIGS. 5 and 6, a communication operation from the main signal buffers (MB1 and MB2) in FIG. 5 is the same as a communication operation in FIG. 6. The control system 301 of the present invention can be realized by disposing the controller 13 and the telemetry apparatus 16 without modifying an existing communication system. Further, since the communication operation in FIG. 6 cannot follow a variation in the maximum throughput of the wireless network, a problem such as an insufficient band or reduced network usage efficiency is caused, and there is no control of transmission time, and thus, a problem such as occurrence of packet collision and imbalance in the terminal or access point capable of transmission is caused. On the other hand, since the control system 301 of the present invention controls the transmission time following the fluctuation in the maximum throughput of the wireless network 15 for the terminal or the access points, the above-mentioned problem is resolved.

A scheduling cycle Tt and a maximum throughput acquisition cycle Tget may be the same or may be different. However, since the acquisition of the maximum throughput places a burden on the control system or network, it is preferable to set Tget≥Tt.

Embodiment 2

The controller 13 can also be realized by a computer and a program, and the program can be recorded on a recording medium or provided through a network.

Figure 7:
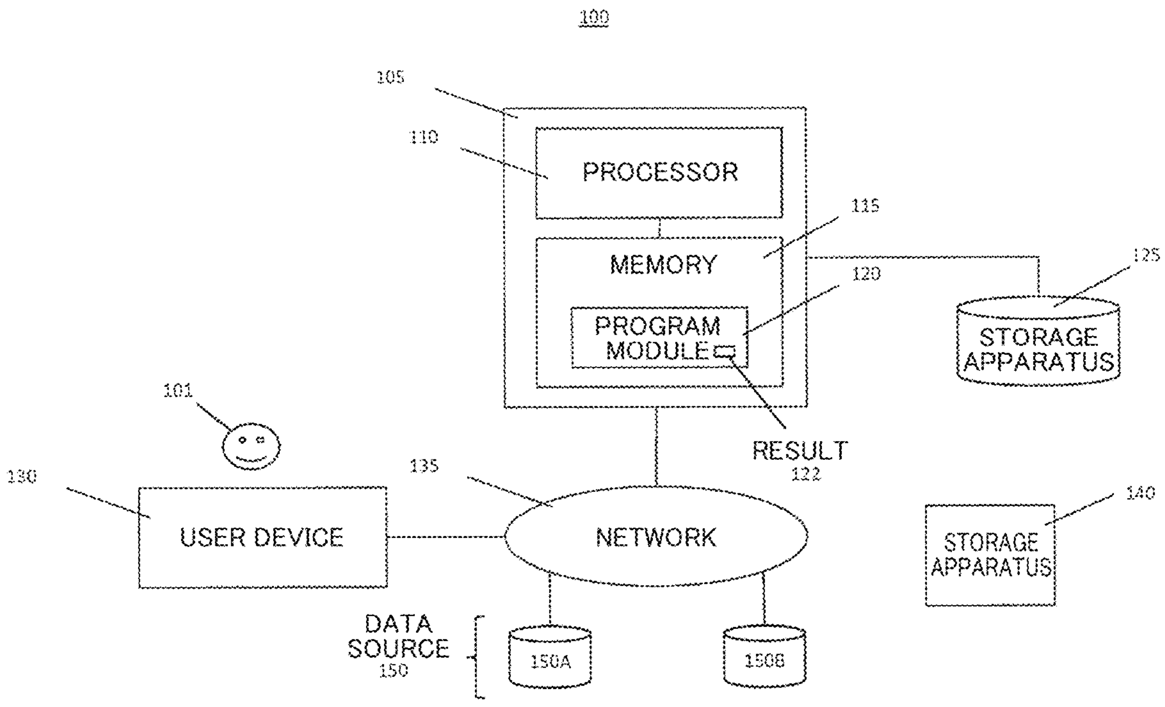
FIG. 7 is a diagram illustrating a control system according to the present invention.

FIG. 7 illustrates a block diagram of system 100. The system 100 includes a computer 105 connected to a network 135.

The network 135 is a data communications network. The network 135 may be a private network or a public network, and can include any one or all of (a) a personal area network covering, for example, a certain room; (b) a local area network covering, for example, a certain building; (c) a campus area network covering, for example, a campus, (d) a metropolitan area network, covering a certain city; (e) a wide area network covering, for example, an area over a boundary between urbans, regions, or nations, and (f) the Internet. Communication is performed using electronic signals and optical signals via the network 135.

The computer 105 includes a processor 110, and a memory 115 coupled to the processor 110. Although the computer 105 is depicted herein as a stand-alone device, the computer 105 is not limited thereto, and rather, the computer 105 may be connected to another device not illustrated in a distributed processing system.

The processor 110 is an electronic device configured of a logic circuit that responds to and executes instructions.

The memory 115 is a tangible computer-readable storage medium in which a computer program has been encoded. In this regard, the memory 115 stores data and instructions, that is, program code that is readable and executable by the processor 110 to control an operation of the processor 110. The memory 115 may be realized as a random access memory (RAM), a hard drive, read only memory (ROM), or a combination thereof. One of components of the memory 115 is a program module 120.

The program module 120 includes instructions for controlling the processor 110 so that the processor 110 executes the processes described herein. Although operations are described in the present specification as being executed by the computer 105, the method, processes or subprocesses thereof, these operations are actually executed by the processor 110.

The term "module" is used to refer to a functional operation that can be implemented as either a stand-alone component or an integrated configuration configured of a plurality of subcomponents in the present specification. Accordingly, the program module 120 may be realized as a single module or as a plurality of modules operating in cooperation. Further, although the program module 120 is described herein as being installed in the memory 115 and thus being realized in software, the program module 120 may be realized in any one of hardware (for example, an electronic circuit), firmware, software, or a combination thereof.

Although the program module 120 is shown as already loaded into the memory 115, the program module 120 may be configured to be located on a storage apparatus 140 so that the program module 120 is loaded into the memory 115 later. The storage apparatus 140 is a tangible computer-readable storage medium that stores the program module 120. Examples of the storage apparatus 140 include a compact disk, a magnetic tape, a read only memory, an optical storage medium, a memory unit configured of a hard drive or a plurality of parallel hard drives, and a universal serial bus (USB) flash drive. Alternatively, the storage apparatus 140 may be a random access memory or another type of electronic storage device that is located in a remote storage system (not illustrated) and connected to the computer 105 via the network 135.

The system 100 further includes a data source 150A and a data source 150B that are collectively referred to herein as a data source 150 and communicatively connected to the network 135.

In fact, the data source 150 may include any number of data sources, that is, one or more data sources. The data source 150 includes unsystematic data and may include social media.

The system 100 further includes a user device 130 operated by a user 101 and connected to the computer 105 via the network 135. Examples of the user device 130 may include an input device such as a keyboard or a voice recognition subsystem for allowing the user 101 to transfer selection of information and commands to the processor 110. The user device 130 further includes a display device or an output device such as a printer or a speech synthesis apparatus. A cursor control unit such as a mouse, a trackball, or a touch-sensitive screen allows the user 101 to operate a cursor on a display apparatus to transfer selection of additional information and commands to the processor 110.

The processor 110 outputs a result 122 of execution of the program module 120 to the user device 130. Alternatively, the processor 110 can provide an output to a storage apparatus 125 such as a database or a memory, or can provide the output to a remote device (not illustrated) via the network 135.

For example, a program that performs steps S131 to S133 in the flowchart in FIG. 4 or steps S231 to S236 in FIG. 9 may be the program module 120. The system 100 can be operated as the controller 13.

The term "comprising" designates that there is a feature, complete entity, step, or component described there, but should not be interpreted as excluding the presence of one or more other features, complete entities, steps, components, or groups thereof. The terms "a" and "an" are indefinite articles and, therefore, embodiments having a plurality of the terms are not excluded.

OTHER EMBODIMENTS

The present invention is not limited to the above-described embodiments, and can be implemented with various modifications without departing from the gist of the present invention. In short, the present invention is not limited to the higher-level embodiment as it is, but can be embodied by modifying the components within the scope of the gist at the implementation stage.

Further, various inventions can be formed by appropriately combining the plurality of components disclosed in the above embodiment. For example, some components may be deleted from all the components illustrated in the embodiments. Further, components from different embodiments may be combined appropriately.

Appendix 1. Scheduling Scheme

Here, a scheduling scheme performed by the scheduling unit SCH13 of the controller 13 will be described.

[1] Fair Scheduling

This scheduling scheme performs calculation for dividing a band or a time by a total number of flow unit buffers (FB1 and FB2) in which packets are accumulated between the flow unit buffers (FB1 and FB2) of the terminal 11 and the access point 12.

Hereinafter, parameters will be described.

The number of flow unit buffers in which packets are accumulated in the terminal 11 and the access point 12: n Time of one cycle time: T [sec]

Total main signal transmission limit per cycle time: Z [Bytes/sec]

Time to transmit a first accumulated packet: $t_{start}$ [sec] $Z=B_{MAX}\times T$.

In this case, a transmission amount $S_J$ [Bytes] of a flow unit buffer #J is calculated as

[Math. 1]

$$S_J = \frac{Z}{n}, \tag{1}$$

and a transmission time $T_J$ [sec] of the flow unit buffer #J is calculated as

[Math. 2]

$$T_J = \frac{T}{n}, \tag{2}$$

and a transmission time $t_J$ [sec] of the flow unit buffer #J is calculated as

[Math. 3]

$$t_J = t_{start} + \sum_{J=1} T_{J-1}. \tag{3}$$

It is conceivable that an order of the flow unit buffers in which transmission starts may be, for example, from a lowest item number organized in the database unit DB of the controller 13.

[2] Scheduling in Consideration of Band Weight

This scheduling scheme is determined on the basis of the number of flow unit buffers in which packets are accumulated between the flow unit buffers (FB1 and FB2) of the terminal 11 and the access point 12, and the accumulated amount of packets.

Hereinafter, parameters will be described.

The accumulated amount of packets of the flow unit buffer #J: $B_J$ [Bytes]

Time of one cycle: T [sec]

Transmission limit per cycle time: Z [Bytes/sec]

Time required to transmit all the packets accumulated in all flow unit buffers: $T_{all}$ [sec]

A time to first transmit the packet among the packets accumulated in all the flow unit buffers: $t_{start}$ [sec]

$Z=B_{MAX}\times T$.

In this case, when

[Math. 4]

$$T_{all} = \frac{\sum_{J=1} B_J}{Z}, \quad (4)$$

the transmission amount SJ [Bytes] of the flow unit buffer #J is

[Math. 5a]

$$S_J = B_J \quad (5a)$$

when $T_{all} \leq T$, and

[Math. 5b]

$$S_J = \frac{T}{T_{all}} B_J \quad (5b)$$

when $T_{all} > T$. The transmission time $T_J$ [sec] of the flow unit buffer #J is calculated as

[Math. 6a]

$$T_J = \frac{S_J}{\sum_{J=1} B_J} T_{all} \quad (6a)$$

when $T_{all} \leq T$, and is calculated as

[Math. 6b]

$$T_J = \frac{S_J}{\sum_{J=1} B_J} T_{all} \quad (6b)$$

when $T_{all} > T$.

The transmission time $t_J$ [sec] of the flow unit buffer #J is calculated as

[Math. 7a]

$$t_J = t_{start} + \sum_{J=1} T_{J-1} \quad (7a)$$

when $T_{all} \leq T$, and is calculated as

[Math. 7b]

$$t_J = t_{start} + \sum_{J=1} T_{J-1} \quad (7b)$$

when $T_{all} > T$.

When $T_{all} > T$, packets that cannot be transmitted are carried forward to a next transmission timing.

Appendix 2. Method of Ascertaining Maximum Throughput

The following can be considered as a method of ascertaining the maximum throughput $B_{MAX}$ of the wireless network 15 of which the telemetry apparatus 16 notifies the controller 13.

(1) Use of Modulation and Coding Scheme (MCS)

In 802.11n, ac, or the like, there is a table called MCS that sets the throughput of the wireless network. The telemetry apparatus 16 detects maximum throughput information $B_{MAX}$ from the MCS used for communication by an access point or the like, and notifies the controller 13 of the maximum throughput information $B_{MAX}$.

(2) Estimation from Amount of Packets Transmitted and Received by Each Terminal and the Access Point The main signal transmission and reception units (MTR1 and MTR2) of each terminal 11 and the access point 12 record transmission and reception information such as the amount and time of transmitted and received packets. The telemetry apparatus 16 detects the transmission and reception information, calculates a current maximum throughput $B_{MAX}$ from the amount of packets transmitted and received between each terminal and the access point, and the time taken from transmission to reception, and notifies the controller 13 of the current maximum throughput $B_{MAX}$.

(3) Estimation Through Transmission of Test Packet

The telemetry apparatus 16 sets a time $T_{test}$ that is less than or equal to the scheduling cycle Tt. The telemetry apparatus 16 causes each terminal and the access point to transmit test packets at the maximum throughput possible in the respective main signal transmission and reception units (MTR1 and MTR2). Each terminal and access point that have received the test packets record an amount of packets and notifies the telemetry apparatus 16 of the amount of packets. The telemetry apparatus 16 calculates the current maximum throughput $B_{MAX}$ from the amount of packets transmitted or received during the time $T_{test}$, and notifies the controller 13 of the current maximum throughput $B_{MAX}$.

(4) Using Other Technologies

The telemetry apparatus 16 calculates the current maximum throughput $B_{MAX}$ using a technology capable of ascertaining the maximum throughput other than (1) to (3) above, and notifies the controller 13 of the current maximum throughput $B_{MAX}$.

REFERENCE SIGNS LIST

11 Terminal
12 Access point
13 Controller
15 Wireless network
16 Telemetry apparatus
50 Upper network apparatus
100 System
101 User
105 Computer
110 Processor
115 Memory
120 Program module
122 Result
125 Storage apparatus
130 User device
135 Network
140 Storage apparatus
150 Data source
300, 301 Control system

The invention claimed is:

1. A method for controlling traffic of a wireless network, the method being a transmission control performed on a terminal and an access point transmitting packets to each other via the wireless network by a controller, and the method comprising:
 receiving a maximum throughput;
 receiving an accumulated amount of transmission packets for each traffic flow accumulated in a buffer as a required band from each of the terminal and the access point;
 determining a band control value for each traffic flow on the basis of the maximum throughput of the wireless network and at least the required band for each traffic flow notified by the terminal;
 notifying the terminal and the access point of the band control value;
 determining transmission time and transmission amount of the transmission packets for each traffic flow on the basis of the maximum throughput and the accumulated amount; and
 transmitting the transmission packets for each traffic flow in the buffer to the wireless network according to the transmission time and the transmission amount.

2. A control system for controlling traffic in a wireless network, comprising:
 a terminal and an access point configured to transmit packets to each other via the wireless network;
 a telemetry apparatus, comprising one or more processors, configured to ascertain a maximum throughput of the wireless network; and
 a controller, comprising one or more processors, configured to perform transmission control on the terminal and the access point, wherein the controller is configured to determine a band control value for each traffic flow on the basis of the maximum throughput notified of by the telemetry apparatus and at least a required band for each traffic flow notified of by the terminal, and notify the terminal and the access point of the band control value, wherein each of the terminal and the access point includes
 a buffer configured to accumulate transmission packets for each traffic flow;
 an apparatus-side transmission and reception unit configured to transmit an accumulated amount of transmission packets for each traffic flow accumulated in the buffer to the controller as the required band, and receive a transmission time and a transmission amount of the transmission packets for each traffic flow from the controller as the band control value; and
 a main signal transmission unit configured to transmit the transmission packets for each traffic flow in the buffer to the wireless network according to the transmission time and the transmission amount;
 the controller includes a control-side transmission and reception unit configured to receive the maximum throughput from the telemetry apparatus, receive the accumulated amount as the required band from each of the terminal and the access point, and transmit the transmission time and the transmission amount to each of the terminal and the access point as the band control value; and
 a scheduling unit, comprising one or more processors, configured to determine the transmission time and the transmission amount of the transmission packets for each traffic flow on the basis of the maximum throughput and the accumulated amount.

3. A non-transitory computer readable medium storing a program, wherein execution of the program causes a computer to function as the controller according to claim 1.

4. A controller for controlling traffic of a wireless network, wherein the controller is an apparatus configured to perform transmission control on a terminal and an access point configured to transmit packets to each other via the wireless network, and includes a function of determining a band control value for each traffic flow on the basis of a maximum throughput of the wireless network and at least a required band for each traffic flow notified of by the terminal, and notifying the terminal and the access point of the band control value, wherein each of the terminal and the access point includes
 a buffer configured to accumulate transmission packets for each traffic flow;
 an apparatus-side transmission and reception unit configured to transmit an accumulated amount of transmission packets for each traffic flow accumulated in the buffer to the controller as the required band, and receive a transmission time and a transmission amount of the transmission packets for each traffic flow from the controller as the band control value;
 a main signal transmission unit configured to transmit the transmission packets for each traffic flow in the buffer to the wireless network according to the transmission time and the transmission amount;
 the controller includes a control-side transmission and reception unit configured to receive the maximum throughput, receive the accumulated amount as the required band from each of the terminal and the access point, and transmit the transmission time and the transmission amount to each of the terminal and the access point as the band control value; and
 a scheduling unit, comprising one or more processors, configured to determine the transmission time and the transmission amount of the transmission packets for each traffic flow on the basis of the maximum throughput and the accumulated amount.

* * * * *